(12) United States Patent
Vicente et al.

(10) Patent No.: US 10,678,506 B2
(45) Date of Patent: Jun. 9, 2020

(54) MATCHING CONSECUTIVE VALUES IN A DATA PROCESSING APPARATUS

(71) Applicant: ARM Limited, Cambridge (GB)

(72) Inventors: Alejandro Martinez Vicente, Cambridge (GB); Jesse Garrett Beu, Austin, TX (US); Mbou Eyole, Cambridge (GB); Timothy Hayes, Cambridge (GB)

(73) Assignee: ARM Limited, Cambridge (GB)

( * ) Notice: Subject to any disclaimer, the term of this patent is extended or adjusted under 35 U.S.C. 154(b) by 40 days.

(21) Appl. No.: 15/665,715

(22) Filed: Aug. 1, 2017

(65) Prior Publication Data

US 2019/0042190 A1 Feb. 7, 2019

(51) Int. Cl.
*G06F 9/30* (2018.01)
*G06F 7/02* (2006.01)

(52) U.S. Cl.
CPC ............ *G06F 7/02* (2013.01); *G06F 9/30018* (2013.01); *G06F 9/30021* (2013.01); *G06F 9/30036* (2013.01); *G06F 9/30145* (2013.01)

(58) Field of Classification Search
CPC .... G06F 7/02; G06F 9/30021; G06F 9/30036; G06F 9/30018; G06F 7/20
See application file for complete search history.

(56) References Cited

U.S. PATENT DOCUMENTS

| | | | | | |
|---|---|---|---|---|---|
| 4,307,377 | A | * | 12/1981 | Pferd ....................... | G06T 9/005 345/443 |
| 4,991,134 | A | * | 2/1991 | Ivsin ........................ | G06F 7/24 340/146.2 |
| 5,608,662 | A | * | 3/1997 | Large ....................... | G06F 7/02 370/394 |
| 7,233,265 | B2 | * | 6/2007 | Cockburn ............ | H03M 7/3086 341/106 |
| 7,299,282 | B2 | | 11/2007 | Sarkissian et al. | |
| 7,908,457 | B2 | * | 3/2011 | Arndt .................. | G06F 12/0646 711/209 |

(Continued)

OTHER PUBLICATIONS

Robert Bedichek, "Some Efficient Architecture Simulation Techniques", Winter 1990 USENIX Conference, 13 pages.

(Continued)

*Primary Examiner* — Cheng Yuan Tseng
(74) *Attorney, Agent, or Firm* — Nixon & Vanderhye P.C.

(57) ABSTRACT

An apparatus and a method of operating the apparatus are provided for performing a comparison operation to match a given sequence of values within an input vector. Instruction decoder circuitry is responsive to a string match instruction specifying a segment of an input vector to generate control signals to control the data processing circuitry to perform a comparison operation. The comparison operation determines a comparison value indicative of whether each input element of a required set of consecutive input elements of the segment has a value which matches a respective value in consecutive reference elements of the reference data item. A plurality of comparison operations may be performed to determine a match vector corresponding to the segment of the input vector to indicate the start position of the substring in the input vector. A string match instruction, as well as simulator virtual machine implementations, are also provided.

11 Claims, 11 Drawing Sheets

(56) References Cited

U.S. PATENT DOCUMENTS

| | | | |
|---|---|---|---|
| 2004/0199630 A1* | 10/2004 | Sarkissian | H04L 29/06 709/224 |
| 2005/0086234 A1* | 4/2005 | Tosey | G06F 17/30324 |
| 2014/0189320 A1 | 7/2014 | Kuo | |
| 2014/0281371 A1* | 9/2014 | Thantry | G06F 9/30036 712/7 |

OTHER PUBLICATIONS

International Search Report and Written Opinion of the International Searching Authority dated Sep. 25, 2018 in PCT/GB2018/051897, 13 pages.

U.S. Appl. No. 15/665,781, filed Aug. 1, 2017, Inventor: Eyole et al.

Office Action dated Apr. 22, 2019 in co-pending U.S. Appl. No. 15/665,781, 10 pages.

Final Office Action dated Oct. 7, 2019 in co-pending U.S. Appl. No. 15/665,781, 6 pages.

\* cited by examiner

MATCHING CONSECUTIVE VALUES IN A DATA PROCESSING APPARATUS

TECHNICAL FIELD

The present disclosure relates to a data processing apparatus. More particularly it relates to performing a search for a given sequence of values.

BACKGROUND

A data processing apparatus may perform a great variety of data processing operations, some of which require it to determine whether a sequence of predefined values, sometimes referred to as a substring, is present in given input data. The complexity of the data processing circuitry required to implement such a capability can become burdensome for large input data items.

SUMMARY

In one example, there is provided an apparatus comprising: instruction decoder circuitry to decode instructions; and data processing circuitry to selectively apply vector processing operations to one or more segments of an input data vector comprising a plurality of segments at respective positions in the input data vector, wherein the instruction decoder circuitry is responsive to a string match instruction specifying a segment of the input data vector and a reference data item, to generate control signals to cause comparison circuitry in the data processing circuitry to: perform a comparison operation to set a comparison value indicative of whether each input element of a required set of consecutive input elements of the segment has a value which matches a respective value in consecutive reference elements of the reference data item.

In another example, there is provided a method of operating an apparatus comprising the steps of: decoding instructions; selectively applying vector processing operations to one or more segments of an input data vector comprising a plurality of segments at respective positions in the input data vector; generating control signals in response to a string match instruction specifying a segment of the input data vector and a reference data item, to cause comparison circuitry in data processing circuitry of the apparatus to: perform a comparison operation to set a comparison value indicative of whether each input element of a required set of consecutive input elements of the segment has a value which matches a respective value in consecutive reference elements of the reference data item.

In another example, there is provided an apparatus comprising: means for decoding instructions; means for selectively applying vector processing operations to one or more segments of an input data vector comprising a plurality of segments at respective positions in the input data vector; means for generating control signals in response to a string match instruction specifying a segment of the input data vector and a reference data item, to cause means for comparing in the apparatus to: perform a comparison operation to set a comparison value indicative of whether each input element of a required set of consecutive input elements of the segment has a value which matches a respective value in consecutive reference elements of the reference data item.

In another example, there is provided a computer program for controlling a host data processing apparatus to provide an instruction execution environment comprising: instruction decoding program logic to decode instructions; and data processing program logic to selectively apply vector processing operations to one or more segments of an input data vector structure comprising a plurality of segments at respective positions in the input data vector structure, wherein the instruction decoding program logic is responsive to a string match instruction specifying a segment of the input data vector structure and a reference data item structure, to generate control signals to cause comparison program logic in the data processing program logic to: perform a comparison operation to set a comparison value indicative of whether each input element of a required set of consecutive input elements of the segment has a value which matches a respective value in consecutive reference elements of the reference data item structure.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
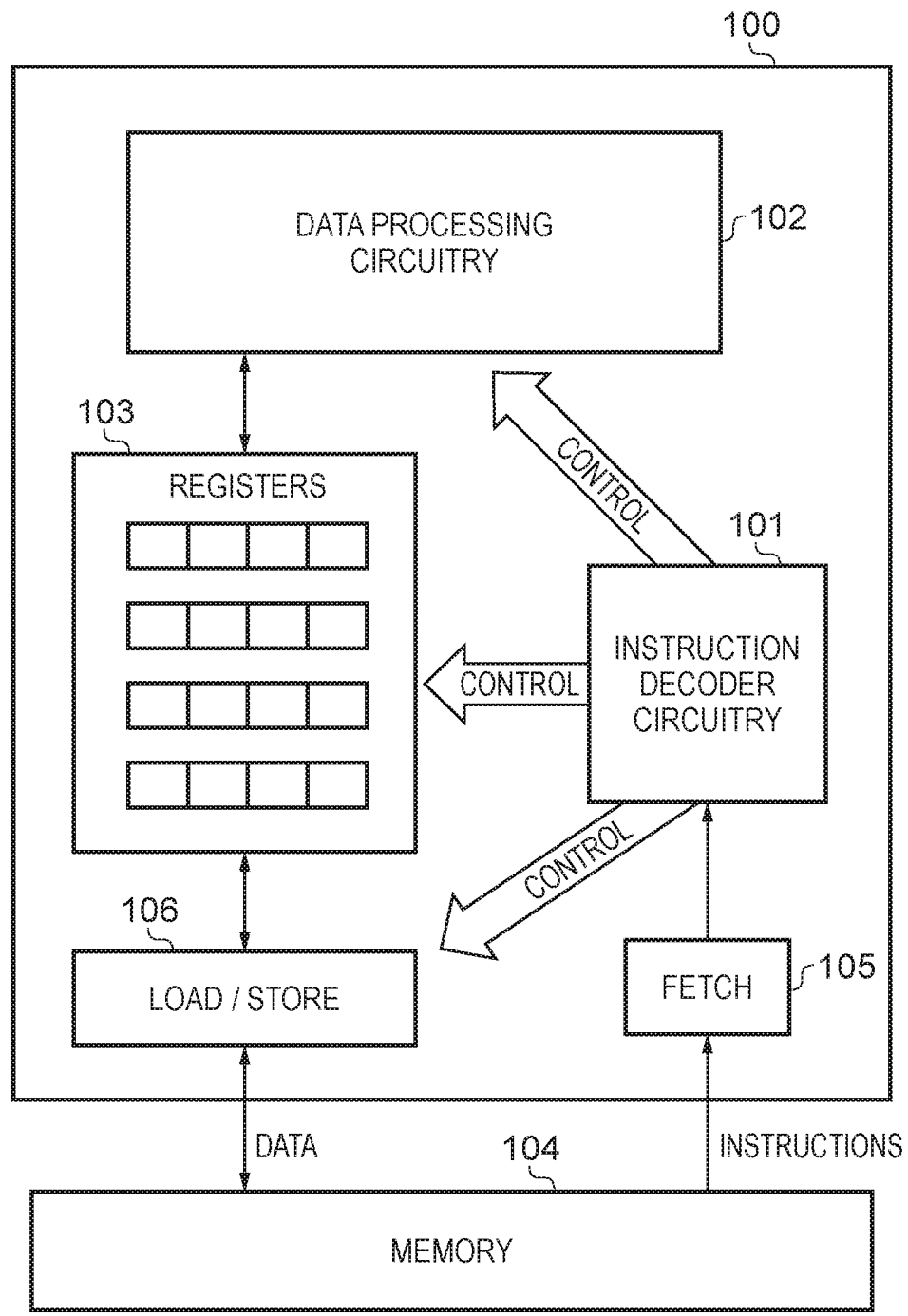
FIG. 1 schematically illustrates an apparatus according to one example.

At least some examples provide an apparatus comprising: instruction decoder circuitry to decode instructions; and data processing circuitry to selectively apply vector processing operations to one or more segments of an input data vector comprising a plurality of segments at respective positions in the input data vector, wherein the instruction decoder circuitry is responsive to a string match instruction specifying a segment of the input data vector and a reference data item, to generate control signals to cause comparison circuitry in the data processing circuitry to: perform a comparison operation to set a comparison value indicative of whether each input element of a required set of consecutive input elements of the segment has a value which matches a respective value in consecutive reference elements of the reference data item.

The data processing apparatus provided can determine whether a sequence of predefined values is present in an input vector. An input vector which is comprised of a plurality of input elements, which each contain a particular value, may be handled by a data processing apparatus in a variety of contexts. Thus where the input vector is a string of data values, then a comparison operation with respect to the elements of the input data vector is carried out, so that it can be determined whether the values in the sequence (substring) are to be found in consecutive input elements of the input data (string). In order to support such a comparison operation the present techniques provide data processing circuitry which is responsive to control signals from instruction decoder circuitry to compare the values of input elements in a segment of an input vector with the values of respective reference elements in a reference data item. It will be appreciated that the reference data item is not limited to comprising a particular number of elements.

The present techniques recognise that a practical issue faced when providing such a data processing apparatus is that the complexity of the circuitry associated with performing the required comparison operations becomes greater, the larger the input data item is, in particular due to the growing number of permutations of comparisons that must be performed between input elements and reference elements, to the extent that the provision of the required circuitry can become impractical. In this context, the present techniques provide data processing circuitry (controlled by the control signals generated by the instruction decoder circuitry) to determine a whether each of a required set of consecutive input elements in a segment of the input vector matches a respective value in consecutive reference elements of the reference data item (search key). This required set of consecutive input elements may be variously defined, as will be discussed in greater detail below, yet generally this approach provides that the circuitry can be practically provided and the required comparison operations carried out. In particular, the efficiency of performing a substring search is improved by implementing the comparison on a segmented basis, with respective reference elements.

In some examples the comparison circuitry is further responsive to the control signals to perform: a match determination process comprising a plurality of comparison operations, wherein the required set of consecutive input elements for each comparison operation starts at a respective candidate offset in the segment for that comparison operation, wherein candidate offset values of the plurality of comparison operations span the segment. In other words, a candidate offset is determined for each comparison operation performed by the match determination process to indicate an offset in the segment at which to perform the comparison operation. A comparison operation is performed for each candidate offset value corresponding to all the offsets of a segment of the input vector. Hence, a comparison value is determined by each comparison operation and corresponds to a given candidate offset value. The offset of the comparison operation is indicative of the position of the set of input elements in the segment which is compared with respective reference elements. By performing a comparison operation for each of a plurality of candidate offsets (candidate offset values), it is possible to determine a comparison value for each possible position of a substring within the range of input elements which are found in the segment. In addition, since each comparison operation of the match determination process is performed on only the input elements in a given segment of the input vector, the complexity of the data processing apparatus can be controlled, even for large input vectors. Hence, all possible positions of a substring in an input vector are searched to improve the accuracy of a substring search while still managing the complexity of the data processing circuitry.

In some examples, a number of elements of the required set of consecutive input elements is equal to a number of reference elements in the reference data item minus the respective candidate offset of the respective comparison operation. When searching for a substring (reference data item) in the input vector, the length of the substring may be greater than the length of a segment. In this situation, if the substring is to be found in the input vector, it will be located across at least two segments, in addition, whilst the first reference element of the reference data item may be found in the segment, the size of the reference data item may be greater than the difference between the size of the segment and the offset value at which the first reference element is found. In this situation the substring will also be located across at least two segments. Hence, there can be a need to determine the required number of consecutive input elements based on the size of the reference data item and the offset value. In this context the present techniques propose that the required set of consecutive input elements may be determined to be the size of the reference data item minus the candidate offset value of a respective comparison operation, which enables the comparison operation to determine whether the remaining input elements of the segment (the input elements of the segment at and after the respective candidate offset position) are a match compared to the corresponding reference elements. Hence, a substring can be found in an input vector even if the substring is situated across more than one segment. In other words the restriction of the comparisons to a segment (in order to manage the potential hardware complexity) need not restrict the length of the substring that can be searched for.

In some examples, the comparison circuitry is responsive to the comparison value being set to set a detected offset value to match a candidate offset value, wherein the detected offset value indicates a base input element identified as a first input element of the consecutive input elements by the comparison operation. For each comparison operation, an associated offset value is used to indicate an offset in the segment at which to begin the comparison operation. The offset value indicates the first input element in the segment to compare with a respective reference element. A comparison value indicates that the required number of consecutive input elements has been found in the segment during a respective comparison operation, and hence the offset value (candidate offset value) used for that comparison operation indicates the position in the segment of the first input element of the consecutive input elements.

By setting a detected offset value to match the candidate offset value used by the comparison operation in which the required set of consecutive input elements is found, it is possible to identify the input element which corresponds to the base input element (the first input element of the substring being searched for) of a possible substring match. It should be noted that identifying a base input element of the consecutive input elements does not require that all the input reference elements of the substring have yet been found in the input vector, but only that the required set of consecutive input elements have been found. Indeed, it may be necessary to perform a plurality of count operations on other segments of the input vector in order to determine whether the whole substring has been found. By setting a detected offset value, a position of a substring can be found even if further segments of the input vector are required to be processed first.

In some examples, the match determination process comprises determining a match vector for the segment and the comparison value of each comparison operation is used to set the value of a respective match element in the match vector, wherein each respective match element has a position in the match vector which corresponds to the respective candidate offset of the comparison operation which determined the comparison value. Thus in some examples the match determination process determines which candidate offsets are used by a respective comparison operation to identify a match between the required set of consecutive input elements and their respective reference elements. This match vector may be used by further processing performed by the data processing circuitry, for example an overflow comparison operation. This means that a possible position of a substring in an input vector can be found, even when the input vector is compartmentalised into segments. Hence, hardware complexity can be manageably constrained without preventing a position of a substring from being reliably determined.

In some examples the data processing circuitry further comprises plural comparison circuitries responsive to the control signals to perform plural match determination processes, each performed for a respective segment from among the plurality of segments. The input vector is compartmentalised into a plurality of segments and each segment comprises a plurality of input elements. Each match determination process is performed using a given segment and is performed by determining whether each of the input elements in a required set of consecutive input elements have a value which matches a respective element in a reference data item. Plural comparison circuitries are comprised within the data processing circuitry and each performs a match determination process using a respective segment from the input vector. This means that the input vector can be efficiently processed in segments in parallel. This approach of segmenting the input vector enables the match determination process to be practically implemented by constraining the hardware complexity to a manageable level.

In some examples, each match determination process comprises determining a respective match vector for the respective segment and the comparison value of each comparison operation is used to set the value of a match element in the match vector, wherein each respective match element has a position in the respective match vector which corresponds to the respective candidate offset of the comparison operation which determined the comparison value. The match vector is comprised of a plurality of match elements which each contain a value which is set to match the comparison value. The match value in each match element therefore indicates whether the base input element of the required set of consecutive input elements is identified at the offset which matches the respective position of the match element. This approach means that the determined offset value can be determined implicitly from the position of a match element with a set match value in the match vector. Accordingly, by setting the match value of a match element with a position which indicates the offset value of the comparison operation which determined a respective comparison value, the base input element can be identified efficiently without requiring significant additional hardware.

In some examples the comparison circuitry of plural comparison circuitries is responsive to an overflow condition being met to propagate an overflow flag for use by an adjacent comparison circuitry of the plural comparison circuitries, wherein the overflow condition is met when the comparison value is set and the number of elements in the required set of consecutive input elements is less than a number of reference elements in the reference data item. Since the input data item is grouped into segments, there are situations in which the reference data item may be located across a plurality of segments. Hence the present techniques propose to propagate an indicator from one comparison circuitry to an adjacent comparison circuitry to indicate that a only a portion of the reference data item (required set of consecutive input elements) has been found in the segment of the comparison circuitry. This enables the adjacent circuitry to reliably determine if a remaining portion (or part of the remaining portion) of the reference data item is in a subsequent segment.

An overflow flag is therefore propagated to an adjacent comparison circuitry when an overflow condition is met. If the number of reference elements in the reference data item is greater than the required set of reference elements for a given comparison operation, then if a base element is identified in the given comparison operation, at least a remaining portion of the reference data item is located in a subsequent segment. Hence, the comparison operation generates the overflow flag to indicate to an adjacent comparison circuitry to determine the required set of consecutive input elements with reference to the determined offset value of the given comparison operation. This means that long subsets can be identified efficiently in an input vector by separating the subset being searched for into a plurality of required sets of consecutive input elements each corresponding to a respective segment of the input vector.

In some examples when the overflow flag is set the adjacent comparison circuitry is responsive to the set overflow flag also to perform an overflow comparison operation to determine a required overflow set of consecutive input elements based on the match vector determined by the match determination process of the comparison circuitry. The match vector determined by the match determination process indicates the base input element of a possible match of the substring. Since the position of the match element in the match vector indicates the detected offset value, the match vector can be used (in addition to the known length of the reference data item) to determine the number of input elements (required overflow set of consecutive input elements) of the segment used by the adjacent comparison circuitry which are required to match the respective reference elements of the remaining part of the reference data item. It will be appreciated that (if the overflow flag propagated to an adjacent comparison circuitry is set) the overflow comparison operation can be performed in addition to a comparison operation for the segment in the adjacent comparison circuitry. By performing an overflow comparison operation using a required overflow set of consecutive input elements, it is possible to reliably search for long subsets in an input vector since a remaining portion of the reference data item can be searched for in addition to the performance of a comparison operation for a given segment.

In some examples the required set of consecutive input elements is indicated by an input predicate vector comprising plural input predicate elements each corresponding to an input element used by the comparison operation, wherein the plural input predicate elements indicate which of the plural input elements comprise the consecutive input elements. For each comparison operation of the plurality of comparison operations in a match determination process, the required set of consecutive input elements varies. The comparison circuitry may comprise a plurality of comparators, wherein each comparator compares the value of an input element with the value of a corresponding reference element. The proposed input predicate vector comprising a plurality of input predicate flags may be provided to indicate which of the comparators should be set. Accordingly, it is possible to activate only those comparators which are required in order to compare each input element of the required set of consecutive input elements with their respective reference elements. Hence, the power consumption of the comparison circuitry can be reduced when performing a match determination process, since it becomes possible to perform only those comparisons which are necessary to perform and the amount of redundant processing is reduced.

In some examples there is provided a method of operating an apparatus comprising the steps of: decoding instructions; selectively applying vector processing operations to one or more segments of an input data vector comprising a plurality of segments at respective positions in the input data vector; generating control signals in response to a string match instruction specifying a segment of the input data vector and a reference data item, to cause comparison circuitry in data processing circuitry of the apparatus to: perform a comparison operation to set a comparison value indicative of whether each input element of a required set of consecutive input elements of the segment has a value which matches a respective value in consecutive reference elements of the reference data item.

At least some examples provide a computer program for controlling a host data processing apparatus to provide an instruction execution environment comprising: instruction decoding program logic to decode instructions; and data processing program logic to selectively apply vector processing operations specified by the instructions to an input data vector structure comprising a plurality of input data item structures at respective positions in the input data vector structure, wherein the instruction decoding program logic is responsive to a count instruction specifying an input data item structure to generate control signals to control the data processing program logic to: perform a count operation to determine a count value indicative of a number of input elements of a subset of the input data item structure which have a value which matches a reference value in a reference element in a reference data item structure.

At least some examples provide a computer-readable storage medium storing in a non-transient manner the computer program according any of the examples mentioned above.

FIG. 1 schematically illustrates a data processing apparatus 100 which may embody various examples of the present techniques. The apparatus comprises data processing circuitry 102 which performs data processing operations on data items in response to a sequence of instructions which it executes. These instructions are retrieved from the memory 104 to which the data processing apparatus 100 has access and, in a manner with which one of ordinary skill in the art will be familiar, fetch circuitry 105 is provided for this purpose. Furthermore, instructions retrieved by the fetch circuitry 105 are passed to the instruction decoder circuitry 101, which generates control signals which are arranged to control various aspects of the configuration and operation of the processing circuitry 102, as well as of a set of registers 103 and a load/store unit 106. Generally, the data processing circuitry 102 may be arranged in a pipelined fashion, yet the specifics thereof are not relevant to the present techniques. One of ordinary skill in the art will be familiar with the general configuration which FIG. 1 represents and further detail description thereof is dispensed herewith merely for the purposes of brevity. The registers 103, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of comparison operations with respect to segments of an input vector which are held in the registers 103, further explanation of which will follow in more detail below with reference to some specific embodiments. Data values required by the data processing circuitry 102 in the execution of the instructions, and data values generated as a result of those data processing instructions, are written to and read from the memory 104 by means of the load/store unit 106. Note also that generally the memory 104 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such as in RAM, in ROM, via a network interface, and so on. The present disclosure describes various novel instructions which the processing circuitry 102 can execute and the figures which follow provide further explanation of the nature of these instructions, variations in the data processing circuitry in order to support the execution of those instructions, and so on.

Figure 2:
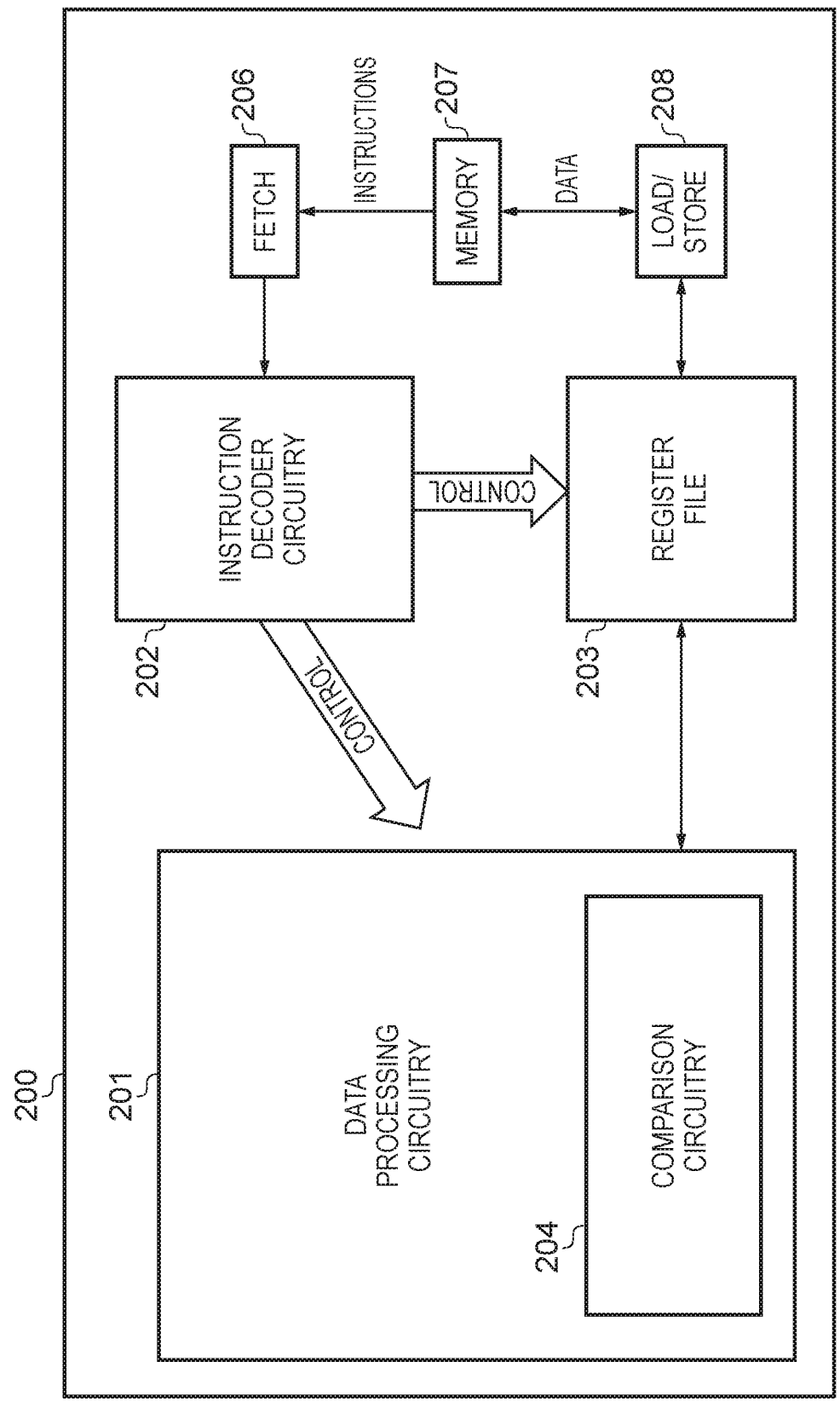
FIG. 2 schematically illustrates an apparatus according to one example.

FIG. 2 schematically illustrates some more detail of the components of a data processing apparatus 200 in one embodiment. The data processing circuitry 201 of FIG. 2 is shown comprising comparison circuitry 204. As illustrated, the data processing circuitry has access to the register file 203 where this access occurs due to the control signals generated by the instruction decode circuitry 202. As was described above in connection with FIG. 1, a sequence of instructions is retrieved from memory 207 by the fetch circuitry 206 and passed to the instruction decoder circuitry 202, whilst the data values required by the data processing apparatus for the performance of its data processing operations are retrieved from the memory 207 by the load/store unit 208 and passed to the register file 203. The instruction decoder circuitry 202 is responsive to a string match instruction to generate appropriate control signals to cause the data processing circuitry 201 perform data processing operations using the content of data values held in the register file 203, some of which are then written back to specified memory addresses by the load/store unit 208. More detail of this processing is described with reference to the following figures.

Figure 3:
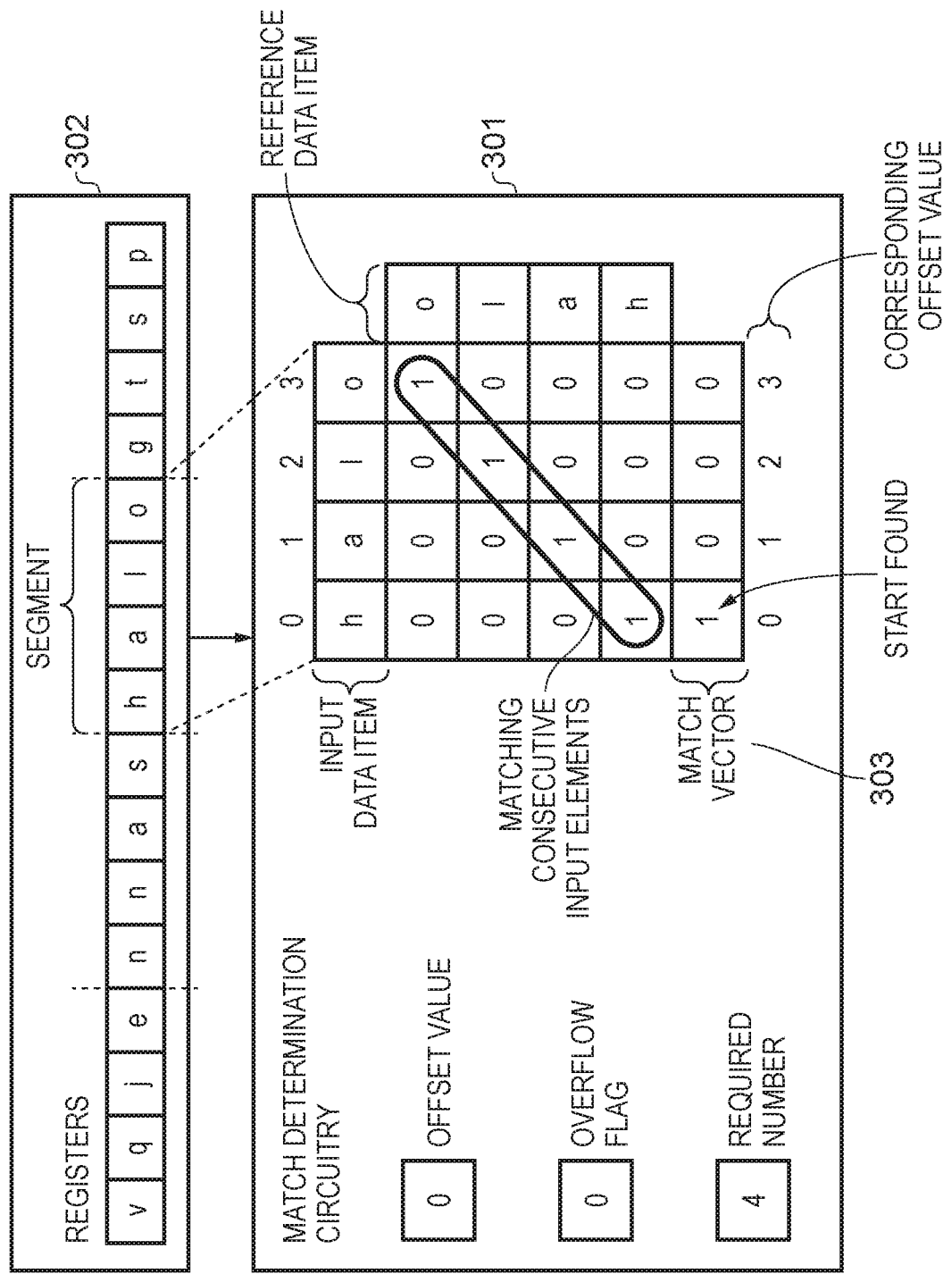
FIG. 3 illustrates a comparison operation performed during a match determination process by match determination circuitry according to one example.

FIG. 3 schematically illustrates match determination circuitry 301 in the data processing circuitry 201 in one embodiment. The match determination circuitry 301 performs a plurality of comparison operations. The comparison circuitry 204 provided to support these operations essentially comprises a matrix of comparators (for this example this being sixteen comparators corresponding to the central 4×4 grid in FIG. 3), each taking one input provided for that row (i.e. one of the reference data item elements) and another input provided for that column (i.e. one of the input data item elements), such that comparisons between any of the input data item elements can be made with any of the reference data item elements. Both the input data item and the reference data item are provided by part of the content of a register (each being specified in the string match instruction) in a set of registers 302 and temporarily held as shown, for example each in an array of flip-flops, such that the comparators can each receive their respective pair of input values for comparison.

Note from FIG. 3 that register which holds the illustrated input vector is shown grouped into segments. These segments correspond to the "width" of the comparison circuitry 204, i.e. four elements in this example. Hence it should be appreciated that for clarity FIG. 3 only illustrates the comparison circuitry corresponding to one segment, but in fact such comparison circuitry is present in the apparatus for each segment, such that the full width of the vector can be searched. The result of each comparison operation, in this one segment, is indicated in the match vector 303. To generate the match vector, the comparators in the comparison circuitry are each arranged to compare the input value contained in each input element with a reference value in a respective reference element. Each comparator comprises a set of logic gates arranged to determine a logic value indicative of whether a given comparison result is a match between the input value and its respective reference value. Referring to the example shown, a comparison operation is performed which is a first comparison operation from among a plurality of comparison operations performed as part of the match determination process. Simply put, in this segment the comparison circuitry is determining if the substring "halo" is found in the string "halo". The comparison operation shown by the encircled values has a candidate "offset value" of "0", indicating that the first input element and each subsequent input element of the input data item comprise the required number of consecutive input elements. Hence, the "required number" of consecutive input elements is "4" as shown in the figure. The individual comparisons (comparisons between an individual input element and its respective reference element) made in this comparison operation (those indicated by the circled values with the label "matching consecutive input elements") and each show a match with the result "1". Other comparisons are also performed and in this case all the results are all "0". However, for the encircled comparison operation, each input element from among the required set of consecutive input elements ("h", "a", "l", and "o") is compared with a respective reference element of the reference data item. In this example, the reference data item is found in the input data item beginning at a position corresponding to the offset value of "0". Hence, as shown, the comparison operation indicates a match between each input element and its respective reference element. In terms of the comparison circuitry, it should therefore be understood that for the generation of the match vector, what is required when the match condition is met is for the value of the match element in the match vector 303 which corresponds to the candidate offset value of "0" to be set (labelled "start found"). This is provided by connections between diagonal paths between the individual comparators (one example of which is given by the set of four encircled comparator results in FIG. 3). Of course the other possible diagonal paths in this set of sixteen comparators are shorter, there being two three-comparator paths, two two-comparators paths, and two one comparator "paths". AND gates connect the comparators on each diagonal path, such that if all elements in the diagonal are found, a set value (to populate the corresponding element of the match vector) is generated. In other words, each diagonal represents a "comparison operation" in the terminology used herein. Note also that although if the reference data item begins somewhere within the input data item (i.e. within this segment to which this comparison circuity corresponds) then only the diagonals comprising that shown encircled and those lower and right of it could find at least part of the reference data item. However, as is discussed below a latter part of the reference data item (i.e. in the example of "halo", this being "alo", "lo", or "o") could be found in this segment, with the preceding part in the preceding segment. Accordingly, generally all comparators are indeed active, and hence the full 4×4 matrix of comparator results shown in FIG. 3 is given. It should also be noted that the match vector is not a "vector" in the sense of the vector registers 302, but rather merely an internally generated array in the match determination circuitry, for example temporarily held in a set of flip-flops, by means of which it can identify the start of the sequence (if found) and to signal this further. Note also that since all elements of the reference data item are found in the current segment, the overflow flag is not set (compare to FIG. 5).

As a further point to note, in an apparatus responsive to other types of instruction (and not just the string matching instruction), the same set of comparators may be used to carry out other types of comparison or other types of processing operation. This reuse of hardware enables the apparatus to have a smaller footprint, or put otherwise, a given footprint can support a greater range of data processing. For example, as will be described later in respect of FIG. 11, an apparatus may further be responsive to a "match segment" instruction which uses the same set of comparators with additional logic gates provided between the comparators, in order to perform a counting operation on the segment.

Figure 4:
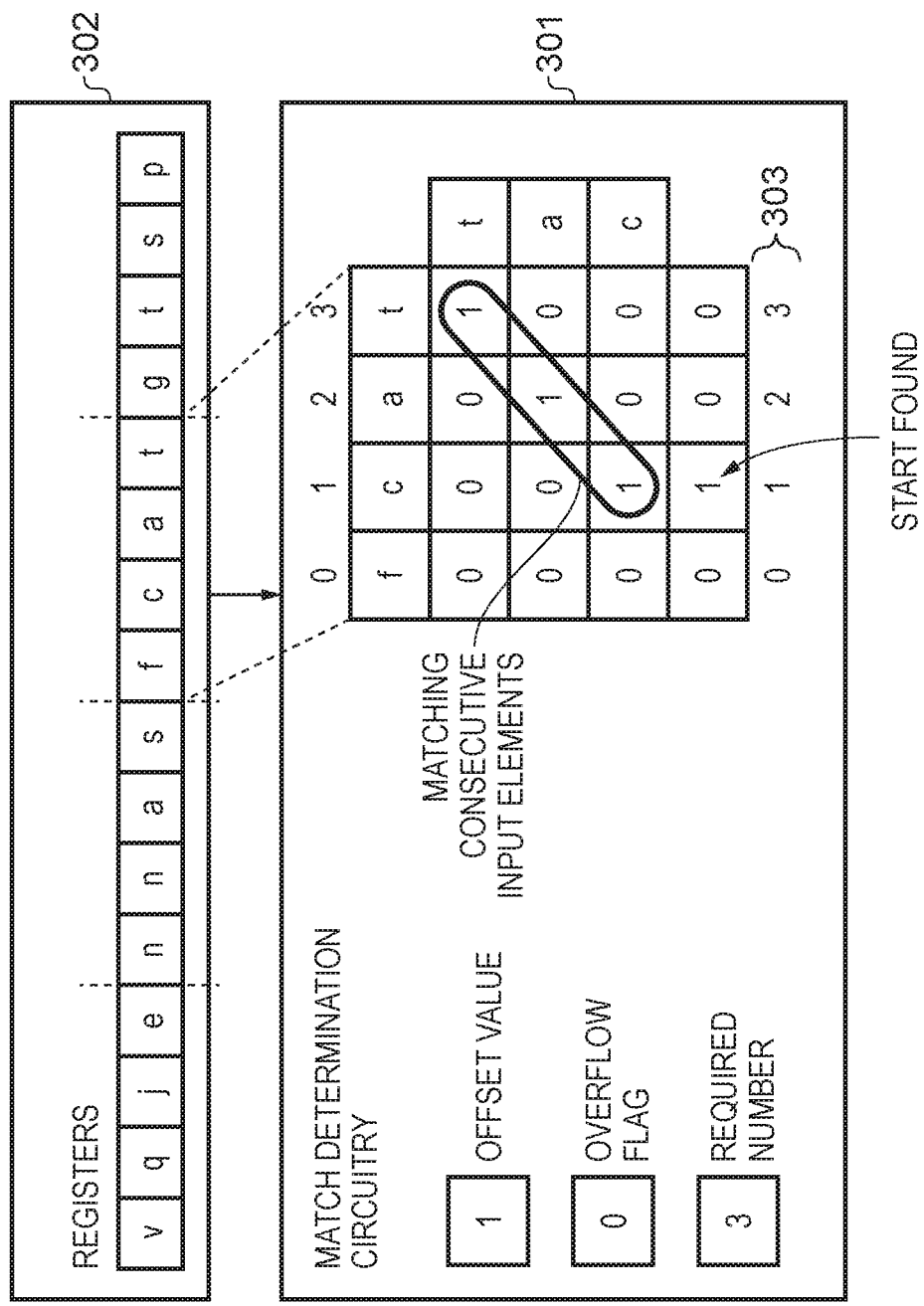
FIG. 4 illustrates a comparison operation corresponding to a given offset value and a given required number in one example.

FIG. 4 schematically illustrates match determination circuitry 301 in the data processing circuitry 201 in one embodiment. The match determination circuitry 301 here also performs a plurality of comparison operations (i.e. diagonal sets of respective comparisons). It will be recognised that the illustration is similar to FIG. 3 (and indeed may represent the very same circuitry, though with different inputs) but in the example of FIG. 4 (by contrast to that of FIG. 3) the reference data item ("cat") is only three elements long. Hence not all possible comparisons (16) between all of the input data item elements (4) and all of the reference data item elements (4) which this circuitry can handle need be made, and for this purpose the programmer may be provided with the possibility to use an input predicate vector (see FIG. 7), which can cause the comparators which are not required (i.e. for a fourth row of comparators) temporarily to be disabled. In the example of FIG. 4, note that the segment comprises a set of 4 input elements as shown which have the input values [f c a t] and the reference data item comprises 3 reference elements which have the reference values [c a t]. In other words, simply put, in this segment the comparison circuitry is determining if the substring "cat" is found in the string "kat". The comparisons as described previously with reference to FIG. 3 are performed, however in this case the comparison operation which finds the substring "cat" has a candidate offset value of "1". In other words this is actually the second of the sets of comparison operations which are performed, in which the whole of the substring "cat" could be found in the input data item (i.e. either starting at offset 0 or starting at offset 1). Of course in the first column (at a candidate offset value of "0"), no match for any of the reference elements is been found with the "f" being in the first (index 0) element of the input data item. However the comparison operation beginning at the input element index "1" is the one that finds the substring in this example. The "required number" is determined with reference to the length of the reference data item and the candidate offset value. Hence for the comparison beginning at index 1 of the input data item, and the length of the reference data item is equal to the number of input elements which have an index equal to or greater than the candidate offset value three), the "required number" is "3". Accordingly, as shown, each input element of the required set of consecutive input elements matches its respective reference element, and the value of the match element in the match vector 303 which corresponds to the candidate offset value of "1" is set. The candidate offset value used by the comparison operation for which the match was found is set to be the "offset value" (detected offset value) and the value of the match vector element at the corresponding index of the match vector is set accordingly.

Figure 5:
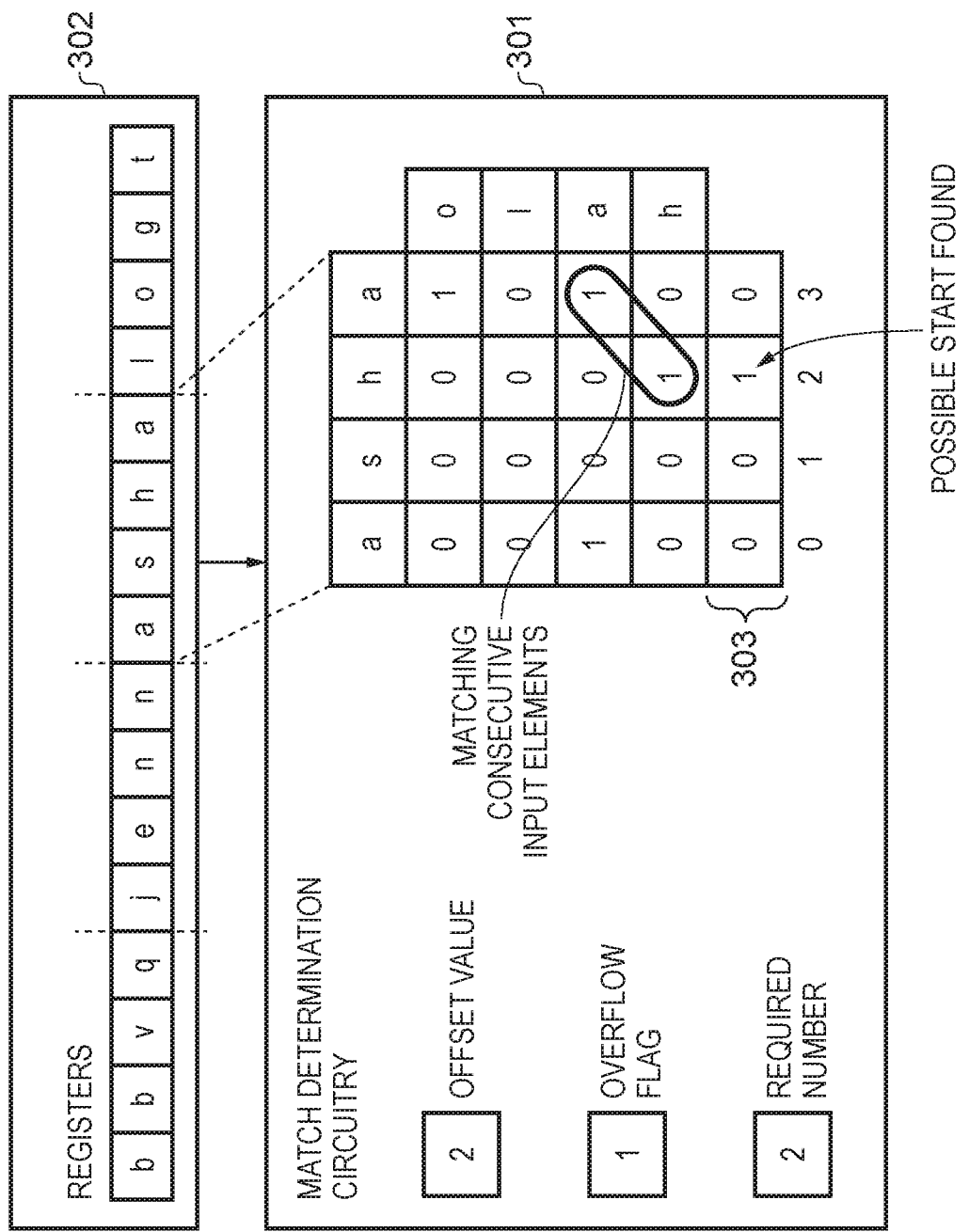
FIG. 5 illustrates a comparison operation wherein the overflow flag is set to cause adjacent comparison circuitry to perform an overflow comparison operation in one example.

FIG. 5 illustrates match determination circuitry 301 and the illustration is similar to FIG. 3 (and indeed may represent the very same circuitry, though with different inputs) which performs a plurality of comparison operations in a match determination process according to one example. In particular, note that while the reference data item again has 4 reference elements, the segment (accessed in the registers 302) corresponding to the illustrated comparison circuitry comprises only a portion (the first two letter "ha") of the reference data item ("halo"). The match determination process performs a plurality of comparison operations each corresponding to a candidate offset value. FIG. 5 highlights the comparison operation for which a candidate offset value of "2" is used. Since the length of the reference data item is greater than the remaining number of index elements with a higher-order index than the candidate offset, the required set of consecutive input elements from among the input elements is bounded by the input element with an index of "2" (corresponding to the candidate offset) and the last input element (with the index of "3"). Hence, the required number of consecutive reference elements in the highlighted comparison is two. As shown, when starting at the offset value of "2", the required set of input elements (i.e. the first two letters) is found in the segment. Accordingly, the match element with an index equal to the offset value is set; moreover since only a portion of the reference data item is found in the current segment, the overflow flag is set. This flag is then propagated to adjacent comparison circuitry and in some examples the offset value (detected offset value) is additionally propagated to the adjacent circuitry. Importantly also, the detection of the substring is not signalled in such an example solely based on the result of this segment, but also requires the remainder of the substring to be found (or at least continued) in the next segment, as is now described.

Figure 6:
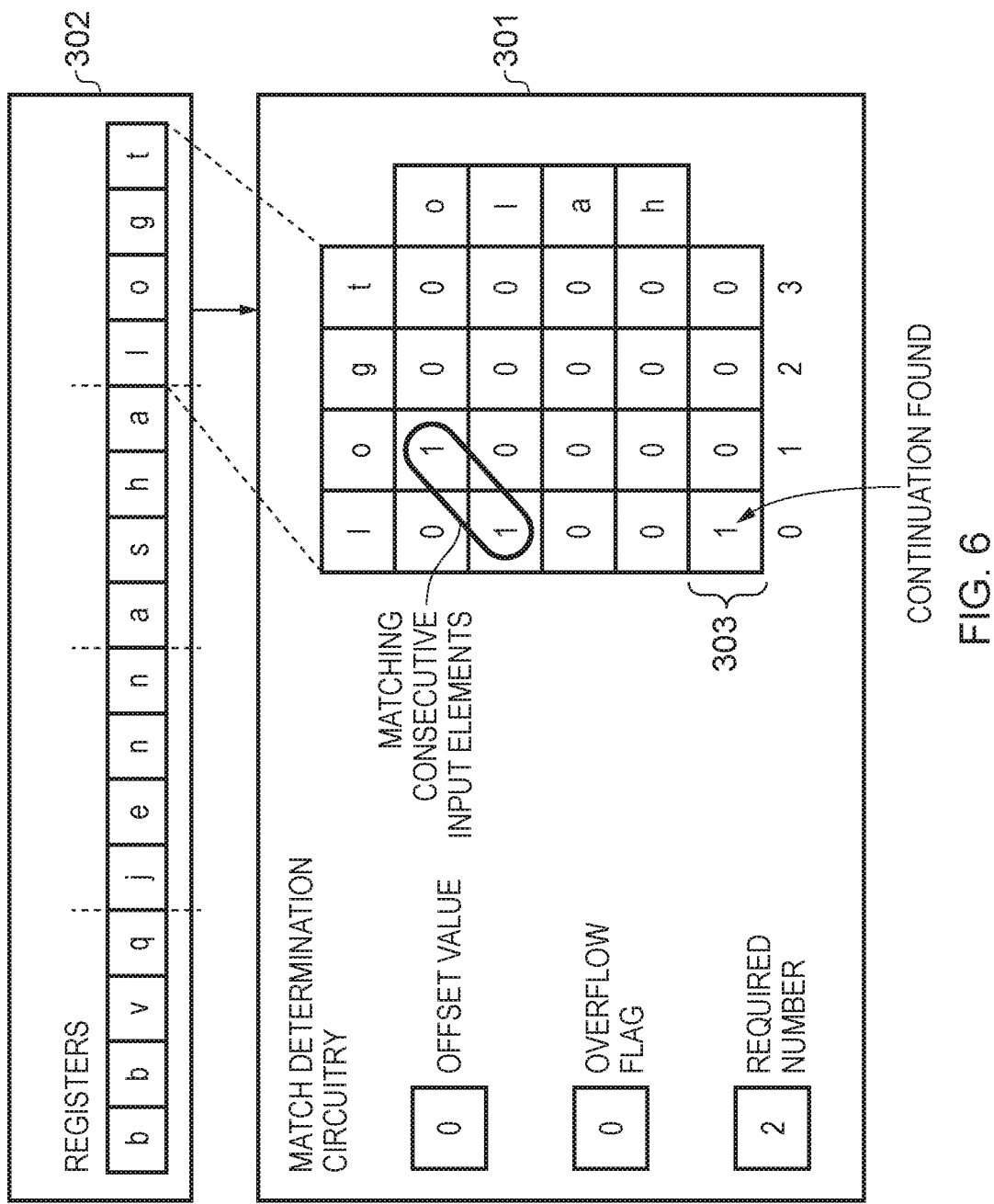
FIG. 6 illustrates an overflow comparison operation being performed by adjacent comparison circuitry in one example.

FIG. 6 illustrates another set of comparison circuitry 204 in match determination circuitry 301 in which an overflow comparison operation of a match determination process is also performed according to one example. An overflow comparison operation becomes of relevance when an overflow flag is propagated from previous (i.e. situated to the left as illustrated) comparison circuitry. Overflow comparison operations are the diagonal runs of comparisons corresponding to less than all of the searched-for reference data item (omitting at least the first reference element). In the example of FIG. 6 these are therefore the diagonals in the upper left triangular half of the set of comparators. These comparisons may always be performed or could be omitted when not required (though this requires some additional circuitry to switch them off when not needed and an initial trigger signal—i.e. the overflow signal from the preceding segment—and this also affects timing, since the comparisons of this segment cannot then be carried out unit those of the preceding segment have generated their result). An overflow comparison operation is performed in order to determine whether at least part of a remaining portion of a reference data item matches respective input elements in a subsequent segment. The subsequent segment is the next segment in the input vector and is accessed in the registers 302. As illustrated in FIG. 6, the encircled comparison operation (a comparison operation with a candidate offset value of "0" and also when the "required number" is less than the reference item length) finds the required latter part of the reference data item. The required number is determined based on the detected offset value of the comparison operation which determined the match in FIG. 5 (as indicated by the match vector of the previous match determination process, as shown in FIG. 5). In particular, since the remaining portion of the reference data item is smaller than the size of a segment, the required number is equal to the length of the reference data item minus the previous detected offset value (namely, it is equal to "2" as shown). The required set of consecutive input elements is therefore bounded by the first and second input elements in the segment used by the overflow comparison circuitry. Hence, the overflow comparison operation compares the values in the first and second input elements with the values in their respective reference elements of the reference data item, where these reference elements are offset by "2" in this example, meaning that the first data input item must be "l" and the second data input item must be "o". As shown, the required set of consecutive input elements [l, o], indeed matches the corresponding reference elements, so the match element with an index equal to the offset value of "0" used by the overflow comparison operation is set. Note that when the overflow flag of a previous segment is set, the set match element has a different meaning, namely as a confirmation that the substring continued in this segment. It is then possible for the comparison circuitry to determine that the full subset (reference data item) has been found in the input vector at a position indicated by the index of the match element in the match vector for the match determination process which identified the base input element (in this case, the previous match determination process).

Figure 7:
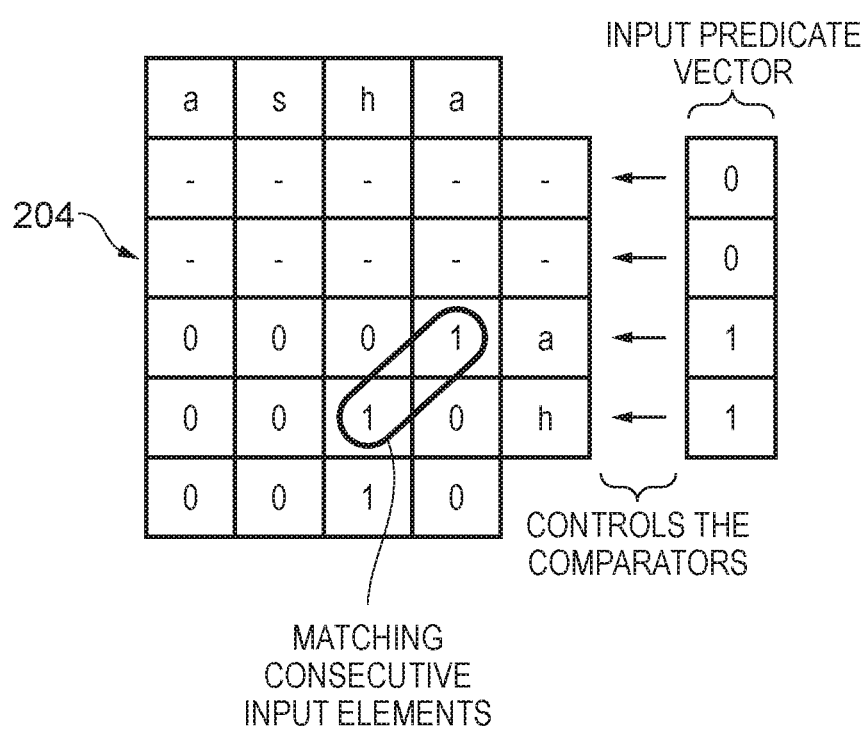
FIG. 7 illustrates an input predicate vector being used to indicate which of the plurality input elements comprise the required set of consecutive input elements in one example.

FIG. 7 illustrates a grid of comparators which are controlled by an input predicate vector according to one example. The input predicate vector is can be used to indicate to the matrix of comparators in the comparison circuitry 204 which comparators to activate. For example, where the length of the reference data item (searched-for key/substring) is shorter than the segment size, some of the comparators can be disabled. The comparison circuitry 204 comprises a plurality of comparators which each correspond to a comparison between a given input element and a respective reference element. Hence, in the illustrated example comprising a segment size of 4 and a possible reference data item size of 4, there is a grid of 16 comparators arranged in a 4×4 grid. The input predicate flags in the input predicate vector shown in FIG. 7 each correspond to the comparators in a given row, as shown, wherein the given row of comparators compare the values of each input element with a given reference data item element. For example in FIG. 7, only the lower two bits of the input predicate vector are set, meaning that only the first two elements of the reference data item are active searched for. In other words, all that must be found is "ha" in this example. Where the upper two bits in the input predicate vector are not set, the upper two rows of comparators are disabled. Finally, the substring "ha" is indeed found in the encircled comparison operation for the third and fourth positions in the segment, so (as described above) the match element in the match vector at the third position is set.

Figure 8:
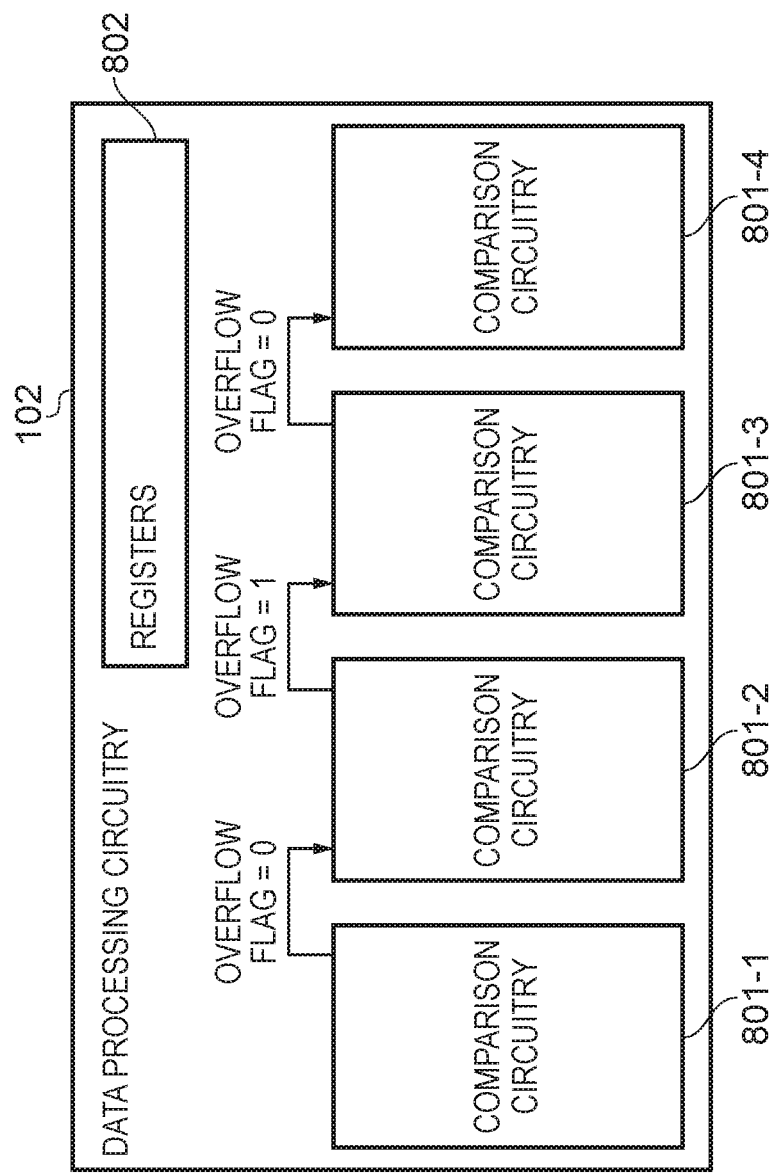
FIG. 8 illustrates data processing circuitry in one example comprising comparison circuitries wherein an overflow flag can be set and propagated to adjacent comparison circuitry.

FIG. 8 illustrates the use of the overflow flag which is input to a comparison circuitry which is adjacent to another comparison circuitry. In particular, data processing circuitry 102 is illustrated comprising registers 802 and a plurality of comparison circuitries 801-1, 801-2, 801-3 and 801-4. These four comparison circuitries thus provide the comparators for the searching in a given segment and together allow the searching across the full width of a vector comprising four segments to be carried out. The propagation of the overflow flag allows the searched-for sequence to cross at least one segment boundary. As shown, the overflow flag propagated from comparison circuitry 801-1 to 801-2 is not set, however the overflow flag propagated from comparison circuitry 801-2 to 801-3 is set. In the example illustrated in FIGS. 6 and 7, in which the reference data item is found in the input vector but is located across two segments, the overflow flag is set and is propagated from the first comparison circuitry 801-2 to an adjacent comparison circuitry 801-3 which performs the overflow comparison operation as described above with reference to FIG. 7.

Figure 9:
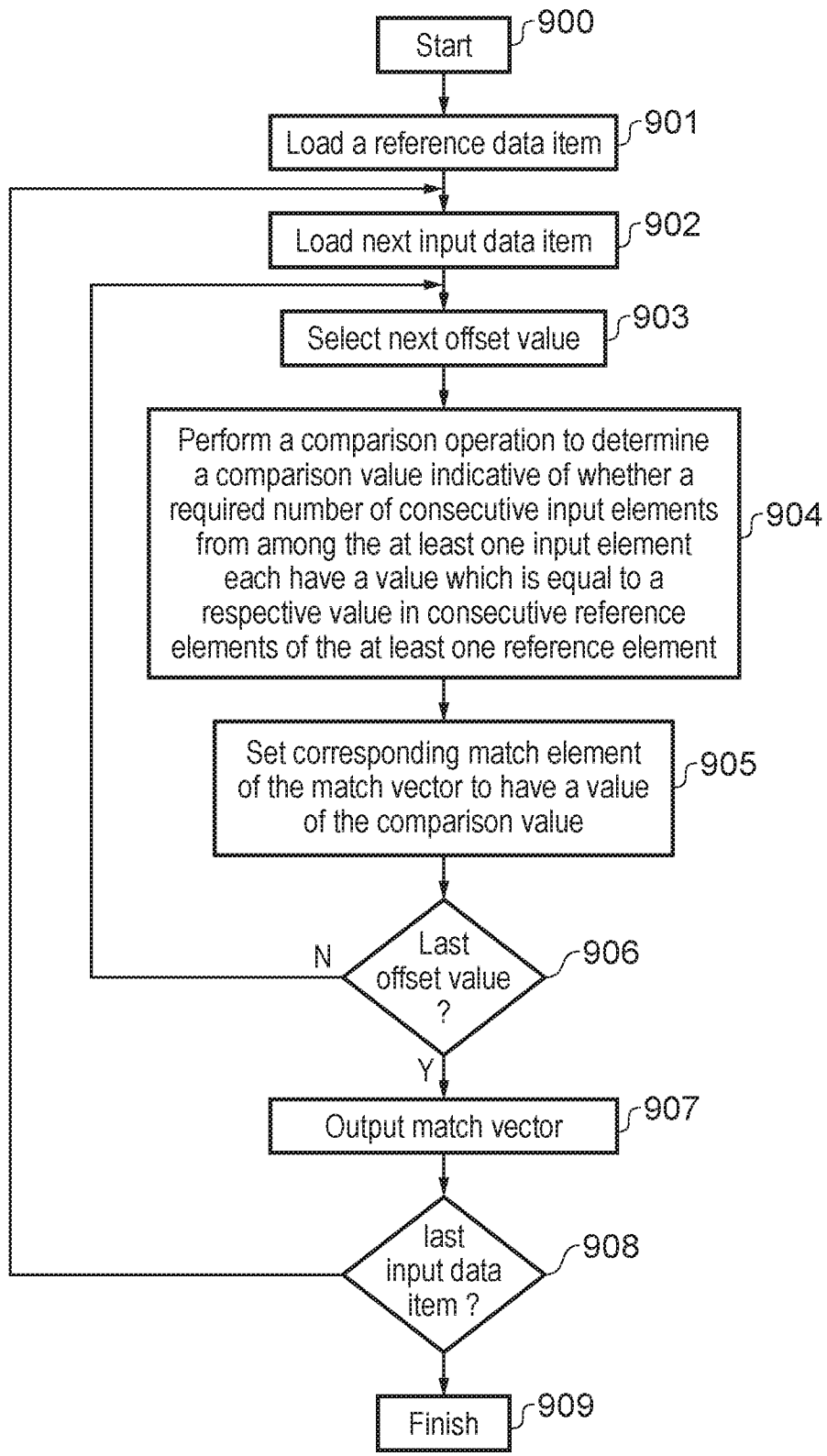
FIG. 9 illustrates a flow diagram showing a sequence of steps which are taken when executing a match determination process in one example.

FIG. 9 illustrates a flow diagram showing the method of operating an apparatus according to one example. The process begins at step 900. A reference data item is loaded at step 901. A next (first at the first iteration) input data item is loaded at step 902. The process continues by selecting the next (first at the first iteration) offset value at step 903. At step 904 a comparison operation is performed to determine a comparison value indicative of whether a required number of consecutive input elements from among the at least one input element each have a value which is equal to a respective value in consecutive reference elements of the at least one reference element. Step 905 sets a corresponding match element of the match vector to have a value of the comparison value. Step 906 determines whether the candidate offset value is the last offset value. If it is not, steps 903-905 are repeated until the condition in step 906 is met. If the condition in step 906 is met, at step 907 the match vector is output. At step 908 it is determined whether the input data item (segment) is the last input data item. If it is not, steps 902-907 are repeated until the condition (this was the last offset value) in step 908 is met. Note that in order to describe the comparison operations most simply the flow diagram recites these as sequential steps (each executed iteration of the step 904 in the inner loop), but it will be appreciated from the descriptions above of the examples of comparison circuitry that where a matrix (e.g. 4×4 in the examples discussed) of comparators is provided these iterations will typically operate in parallel and therefore all comparison operations for a given input data item (i.e. segment content) are performed at the same time. Similarly, note that in order to describe the input data item (i.e. segment comparisons most simply the flow diagram recites these as sequential steps (at each executed iteration through the step 902 of the outer loop), but it will be appreciated from the descriptions above of the examples of comparison circuitry that where a set of comparison circuitries (e.g. four parallel in the examples discussed) is provided these circuitries will typically operate in parallel and therefore each input data item (i.e. segment content) of the vector referenced by the instruction are performed at the same time. Finally, if the condition in step 908 is met, then the method finishes at step 909.

Figure 10:
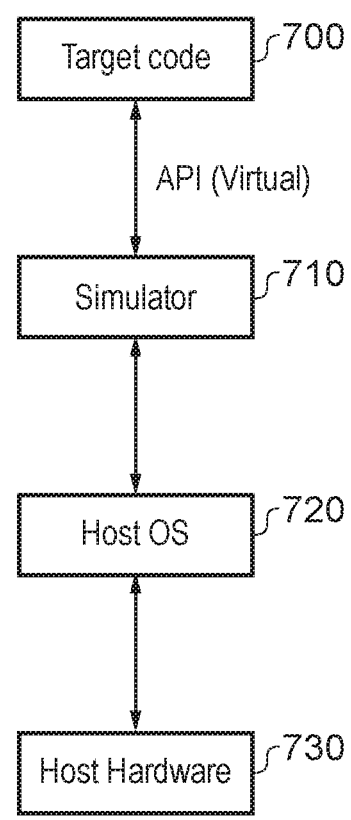
FIG. 10 schematically illustrates the components of a system which provides a simulator implementation in one embodiment.

FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include the applications, operating systems and a hypervisor as shown in FIG. 2) which is the same as the application program interface of the hardware architecture being modelled by the simulator program 710. Thus, the program instructions of the target code 700, including the string match instructions described above, may be executed from within the instruction execution environment using the simulator program 710, so that a host computer 730 which does not actually have the hardware features of the apparatus 2 discussed above can emulate these features.

Figure 11:
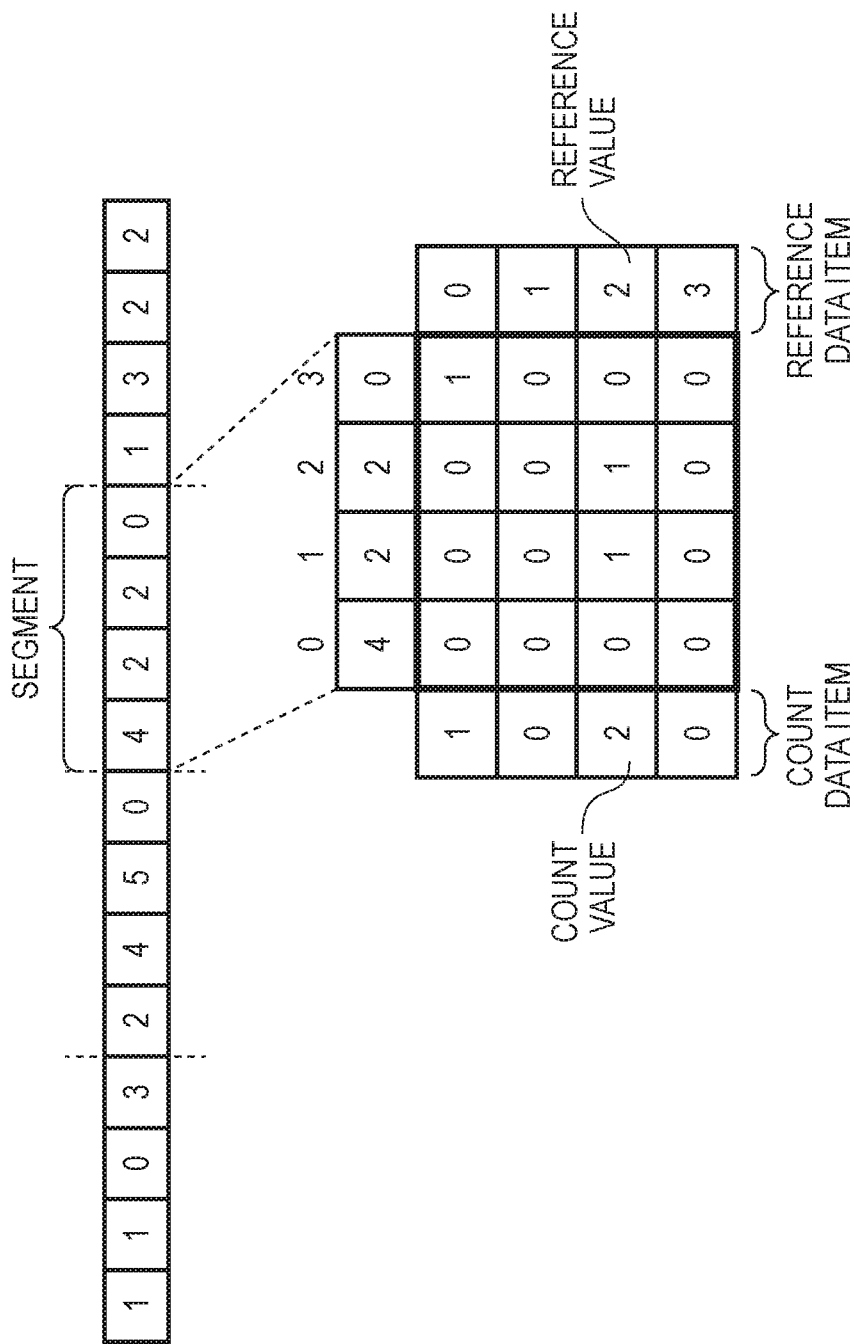
FIG. 11 illustrates comparison circuitry present in an apparatus in some embodiments which is used to implement a "match segment" instruction (itself not the subject of the present techniques), but where the comparison circuitry is also used to implement the string match instructions of the present techniques.

FIG. 11 illustrates the same set of 16 comparators as described in various examples above (i.e. in a 4×4 matrix in "comparison circuitry") but where these comparators are also put to another use in the apparatus. In the example shown this corresponds to their use in response to a "match segment" (aka MATCHSEG) instruction also defined for the apparatus. This MATCHSEG instruction specifies a source register containing an input vector, again subdivided into segments to match the width of each comparison circuitry, and causes a determination to be made for each segment of a set of count values, each indicative of how many times a corresponding reference value in a reference data item is to be found in any of the elements of that segment. Accordingly, the central 4×4 matrix of values shown FIG. 11 corresponds to the same set of comparators as those described with reference (originally) to FIG. 3, with additional connections provided to between the comparators. Unlike in the above discussed examples (starting with FIG. 3) these connections for horizontal runs of comparators (in the orientation shown in FIG. 11) and sum the matches found for each comparison, to give the sum count value in each element of the labelled "count data item". As shown in the example of FIG. 11, the segment contains the set of input values [4 2 2 0] and the reference data item comprises the set of 4 reference values [0 1 2 3]. The count operation is performed for each reference value in a respective reference element of the reference data item. Hence, for the first reference value "0", one match is found (in the segment element indexed 0) and the resulting count value is then one. In respect of the second reference element with the reference value "1", since there are no input elements of the segment with an value of "1", the count value for that reference element is zero. This is also the case for the final reference element with reference value "3". However, since there are two instances of an input element in the subset with an input value of "2", the count value corresponding to the third reference element with a value "2" has a count value of two. Accordingly, each count value indicates the number of input elements in the segment which contain an input value which matches the respective reference value. The comparison circuitry (item 204 in FIG. 2) provided to support the comparison operations according to the present techniques additionally supports these count operations performed in response to the MATCHSEG instruction, where the control signals generated in response to this instruction cause the count values derived from the comparators outputs to be output, which the control signals generated in response to the string match instruction of the present techniques cause the match vector to be used to indicated if (and where) a match of the searched-for reference data item was found. Hence the control signals generated by the instruction decoder circuitry in response to a given instruction are operable to configure the comparison circuitry 204 to perform a either a substring comparison operation or a count operation, possibly among others, in dependence on the instruction supplied to the instruction decoder circuitry.

In brief overall summary an apparatus and a method of operating the apparatus are provided for performing a comparison operation to match a given sequence of values within an input vector. Instruction decoder circuitry is responsive to a string match instruction specifying a segment of an input vector to generate control signals to control the data processing circuitry to perform a comparison operation. The comparison operation determines a comparison value indicative of whether each input element of a required set of consecutive input elements of the segment has a value which matches a respective value in consecutive reference elements of the reference data item. A plurality of comparison operations may be performed to determine a match vector corresponding to the segment of the input vector to indicate the start position of the substring in the input vector.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   instruction decoder circuitry to decode instructions; and
   data processing circuitry to selectively apply vector processing operations to one or more segments of an input data vector comprising a plurality of segments at respective positions in the input data vector,
   wherein the instruction decoder circuitry is responsive to a string match instruction specifying a segment of the input data vector and a reference data item, to generate control signals to cause comparison circuitry in the data processing circuitry to perform:
      a comparison operation to set a comparison value indicative of whether each input element of a required set of consecutive input elements of the segment has a value which matches a respective value in consecutive reference elements of the reference data item, and
      a match determination process comprising a plurality of comparison operations, wherein the required set of consecutive input elements for each comparison operation starts at a respective candidate offset in the segment for that comparison operation, wherein candidate offset values of the plurality of comparison operations span the segment, and
   wherein the data processing circuitry further comprises plural comparison circuitries, each of the plural comparisons circuitries being responsive to the control signals to perform a respective one of plural match determination processes, each of the plural match determination processes being performed for a respective segment from among the plurality of segments, and each of the plural match determination processes comprising the plurality of comparison operations, wherein each of the plurality of comparison operations sets a respective comparison value indicative of whether each input element of a required set of consecutive input elements of the respective segment has a value which matches a respective value in consecutive reference elements of the reference data item.

2. The apparatus of claim 1, wherein a number of elements of the required set of consecutive input elements is equal to a number of reference elements in the reference data item minus the respective candidate offset of the respective comparison operation.

3. The apparatus of claim 1, wherein the comparison circuitry is responsive to the comparison value being set to set a detected offset value to match a candidate offset value, wherein the detected offset value indicates a base input element identified as a first input element of the consecutive input elements by the comparison operation.

4. The apparatus of claim 1, wherein the match determination process comprises determining a match vector for the segment and the comparison value of each comparison operation is used to set the value of a respective match element in the match vector,
wherein each respective match element has a position in the match vector which corresponds to the respective candidate offset of the comparison operation which determined the comparison value.

5. The apparatus of claim 1, wherein each match determination process comprises determining a respective match vector for the respective segment and the comparison value of each comparison operation is used to set the value of a match element in the match vector,
wherein each respective match element has a position in the respective match vector which corresponds to the respective candidate offset of the comparison operation which determined the comparison value.

6. The apparatus of claim 1, wherein the comparison circuitry of plural comparison circuitries is responsive to an overflow condition being met to propagate an overflow flag for use by an adjacent comparison circuitry of the plural comparison circuitries,
wherein the overflow condition is met when the comparison value is set and the number of elements in the required set of consecutive input elements is less than a number of reference elements in the reference data item.

7. The apparatus of claim 6, wherein when the overflow flag is set the adjacent comparison circuitry is responsive to the set overflow flag also to perform an overflow comparison operation to determine a required overflow set of consecutive input elements based on the match vector determined by the match determination process of the comparison circuitry.

8. The apparatus of claim 1, wherein the required set of consecutive input elements is indicated by an input predicate vector comprising plural input predicate elements each corresponding to an input element used by the comparison operation,
wherein the plural input predicate elements indicate which of the plural input elements comprise the consecutive input elements.

9. A method of operating an apparatus comprising the steps of:
decoding instructions;
selectively applying vector processing operations to one or more segments of an input data vector comprising a plurality of segments at respective positions in the input data vector;
generating control signals in response to a string match instruction specifying a segment of the input data vector and a reference data item, to cause comparison circuitry in data processing circuitry of the apparatus to perform:
a comparison operation to set a comparison value indicative of whether each input element of a required set of consecutive input elements of the segment has a value which matches a respective value in consecutive reference elements of the reference data item, and
a match determination process comprising a plurality of comparison operations, wherein the required set of consecutive input elements for each comparison operation starts at a respective candidate offset in the segment for that comparison operation, wherein candidate offset values of the plurality of comparison operations span the segment, and
wherein the data processing circuitry further comprises plural comparison circuitries, each of the plural comparisons circuitries being responsive to the control signals to perform a respective one of plural match determination processes, each of the plural match determination processes being performed for a respective segment from among the plurality of segments, and each of the plural match determination processes comprising the plurality of comparison operations, wherein each of the plurality of comparison operations sets a respective comparison value indicative of whether each input element of a required set of consecutive input elements of the respective segment has a value which matches a respective value in consecutive reference elements of the reference data item.

10. An apparatus comprising:
means for decoding instructions;
means for selectively applying vector processing operations to one or more segments of an input data vector comprising a plurality of segments at respective positions in the input data vector;
means for generating control signals in response to a string match instruction specifying a segment of the input data vector and a reference data item, to cause data processing means for comparing in the apparatus to perform:
a comparison operation to set a comparison value indicative of whether each input element of a required set of consecutive input elements of the segment has a value which matches a respective value in consecutive reference elements of the reference data item,
a match determination process comprising a plurality of comparison operations, wherein the required set of consecutive input elements for each comparison operation starts at a respective candidate offset in the segment for that comparison operation, wherein candidate offset values of the plurality of comparison operations span the segment,
wherein the data processing means further comprises plural comparison means responsive to the control signals to perform plural match determination processes, each performed for a respective segment from among the plurality of segments, each of the plural comparisons means being responsive to the control signals to perform a respective one of plural match determination processes, each of the plural match determination processes being performed for a respective segment from among the plurality of segments, and each of the plural match determination processes comprising the plurality of comparison operations, wherein each of the plurality of comparison operations sets a respective comparison value indicative of whether each input element of a required set of consecutive input elements of the respective segment has a value which matches a respective value in consecutive reference elements of the reference data item.

11. A computer-readable storage medium storing in a non-transient fashion a computer program for controlling a host data processing apparatus to provide an instruction execution environment comprising:
instruction decoding program logic to decode instructions; and data processing program logic to selectively apply vector processing operations to one or more segments of an input data vector structure comprising a plurality of segments at respective positions in the input data vector structure, wherein the instruction decoding program logic is responsive to a string match instruction specifying a segment of the input data vector structure and a reference data item structure, to generate control signals to cause comparison program logic in the data processing program logic to perform:

a comparison operation to set a comparison value indicative of whether each input element of a required set of consecutive input elements of the segment has a value which matches a respective value in consecutive reference elements of the reference data item structure, a match determination process comprising a plurality of comparison operations, wherein the required set of consecutive input elements for each comparison operation starts at a respective candidate offset in the segment for that comparison operation, wherein candidate offset values of the plurality of comparison operations span the segment, wherein the data processing program logic further comprises plural sets of comparison program logic, each set of comparison program logic being responsive to the control signals to perform a respective one of plural match determination processes, each of the plural match determination processes being performed for a respective segment from among the plurality of segments, and each of the plural match determination processes comprising the plurality of comparison operations, wherein each of the plurality of comparison operations sets a respective comparison value indicative of whether each input element of a required set of consecutive input elements of the respective segment has a value which matches a respective value in consecutive reference elements of the reference data item responsive to the control signals to perform plural match determination processes, each performed for a respective segment from among the plurality of segments.

* * * * *